(12) United States Patent
Lee et al.

(10) Patent No.: US 10,882,010 B2
(45) Date of Patent: Jan. 5, 2021

(54) HUMIDIFYING MEMBRANE FOR REVERSE ELECTRODIALYSIS AND METHOD FOR MANUFACTURING THE SAME

(71) Applicant: Industry-University Cooperation Foundation Hanyang University, Seoul (KR)

(72) Inventors: Young Moo Lee, Seoul (KR); Chi Hoon Park, Jinju-si (KR); So Young Lee, Seoul (KR); Doo Sung Hwang, Seoul (KR); Dongwon Shin, Seoul (KR); Doo Hee Cho, Yongin-si (KR); Kang Hyuck Lee, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 89 days.

(21) Appl. No.: 16/095,037

(22) PCT Filed: Apr. 18, 2017

(86) PCT No.: PCT/KR2017/004147
§ 371 (c)(1),
(2) Date: Oct. 19, 2018

(87) PCT Pub. No.: WO2017/183890
PCT Pub. Date: Oct. 26, 2017

(65) Prior Publication Data
US 2019/0126212 A1    May 2, 2019

(30) Foreign Application Priority Data
Apr. 21, 2016  (KR) .................. 10-2016-0048531

(51) Int. Cl.
| | | |
|---|---|---|
| B01D 71/28 | (2006.01) | |
| B01D 61/42 | (2006.01) | |
| C08J 5/22 | (2006.01) | |
| F03G 7/04 | (2006.01) | |
| C08J 7/12 | (2006.01) | |
| B01D 69/02 | (2006.01) | |
| F03G 7/00 | (2006.01) | |
| H01M 8/22 | (2006.01) | |
| C08J 7/06 | (2006.01) | |
| C08L 81/02 | (2006.01) | |
| B01D 67/00 | (2006.01) | |
| B01D 71/56 | (2006.01) | |
| B01D 71/68 | (2006.01) | |
| H01M 6/34 | (2006.01) | |
| C02F 1/469 | (2006.01) | |

(52) U.S. Cl.
CPC ............ *B01D 71/28* (2013.01); *B01D 61/42* (2013.01); *B01D 67/009* (2013.01); *B01D 67/0093* (2013.01); *B01D 69/02* (2013.01); *B01D 71/56* (2013.01); *B01D 71/68* (2013.01); *C08J 5/22* (2013.01); *C08J 5/2256* (2013.01); *C08J 7/06* (2013.01); *C08J 7/12* (2013.01); *C08L 81/02* (2013.01); *F03G 7/00* (2013.01); *F03G 7/005* (2013.01); *F03G 7/04* (2013.01); *H01M 6/34* (2013.01); *H01M 8/227* (2013.01); *B01D 2323/04* (2013.01); *B01D 2325/42* (2013.01); *C02F 1/4693* (2013.01); *C08J 2381/06* (2013.01)

(58) Field of Classification Search
CPC ........ B01D 71/28; B01D 71/56; B01D 71/68; B01D 61/42; B01D 69/02; B01D 2323/04; B01D 2325/42; C08J 5/22; C08J 5/2256; C08J 7/12; C08J 7/06; C08J 2381/06; F03G 7/04; F03G 7/005; F03G 7/00; H01M 6/34; H01M 8/227
USPC .......................................................... 521/27
See application file for complete search history.

(56) References Cited

U.S. PATENT DOCUMENTS

| | | | | |
|---|---|---|---|---|
| 10,516,182 | B2 * | 12/2019 | Lee | .............. H01M 8/1065 |
| 2013/0288142 | A1 | 10/2013 | Fu et al. | |
| 2014/0335439 | A1 * | 11/2014 | Lee | .............. C08J 5/2256 |
| | | | | 429/492 |

FOREIGN PATENT DOCUMENTS

| | | |
|---|---|---|
| KR | 10-1999-0003661 A | 1/1999 |
| KR | 10-0727216 B1 | 6/2007 |
| KR | 10-2010-0047517 A | 5/2010 |
| KR | 10-2010-0100861 A | 9/2010 |
| KR | 10-2011-0110362 A | 10/2011 |

(Continued)

OTHER PUBLICATIONS

International Search Report of PCT/KR2017/004147 dated Jul. 25, 2017 [PCT/ISA/210].

*Primary Examiner* — Michael Bernshteyn
(74) *Attorney, Agent, or Firm* — Sughrue Mion, PLLC

(57) ABSTRACT

The present disclosure relates to a technique for manufacturing a humidifying membrane including a hydrophobic thin film-coating layer having a nano-sized crack morphology pattern on the surface of an aromatic hydrocarbon-based polymer ion exchange membrane and applying the membrane to a reverse electrodialysis process. The humidifying membrane including a hydrophobic thin film-coating layer having a nano-sized crack morphology pattern on the surface of an aromatic hydrocarbon-based polymer ion exchange membrane, manufactured according to the present disclosure, embodies a low bulk resistance of the ion exchange membrane and significantly improves ion selectivity, thereby overcoming the trade-off relationship between membrane resistance and ion selectivity, and thus may be commercially available as an anion and cation exchange membrane of a reverse electrodialysis device.

9 Claims, 7 Drawing Sheets

(56) References Cited

FOREIGN PATENT DOCUMENTS

| | | | |
|---|---|---|---|
| KR | 10-1292214 | B1 | 8/2013 |
| KR | 10-1511990 | B1 | 4/2015 |
| KR | 10-2015-0111852 | A | 10/2015 |

* cited by examiner a b

HUMIDIFYING MEMBRANE FOR REVERSE ELECTRODIALYSIS AND METHOD FOR MANUFACTURING THE SAME

CROSS REFERENCE TO RELATED APPLICATIONS

This application is a National Stage of International Application No. PCT/KR2017/004147, filed Apr. 18, 2017, claiming priority based on Korean Patent Application No. 10-2016-0048531, filed Apr. 21, 2016.

TECHNICAL FIELD

The present disclosure relates to a self-humidifying membrane for reverse electrodialysis and a method for manufacturing the same. More particularly, the present disclosure relates to a technique for manufacturing a self-humidifying membrane including a hydrophobic thin film-coating layer having a nano-sized crack morphology pattern on the surface of an aromatic hydrocarbon-based polymer ion exchange membrane and applying the membrane to a reverse electrodialysis process.

BACKGROUND ART

In general, ion exchange membranes have been widely applied to separation, energy conversion and storage systems, or the like, and selective barrier property is known as an essential factor for realizing high performance in membrane-integrated systems. A membrane having a selective transport surface that shows characteristics contrast to those of a bulk state material has a potential of overcoming a trade-off behavior between permeability and selectivity, occurring commonly in various application fields. Particularly, in the case of an ion exchange membrane applied to an energy conversion system, or the like, it is very important to control the water content in a membrane. According to the related art, an external controlling method, such as water supplying or high-temperature operation, has been used to induce self-humidifying property of a membrane, and thus ion conductivity could be improved slightly. However, there is still a limitation in improvement of ion selectivity (Patent Document 1).

Meanwhile, a reverse electrodialysis (RED) process for generating electric energy reversely uses the principle of electrodialysis including removal of ions in a solution by electricity. In the reverse electrodialysis process, an ion exchange membrane (cation exchange membranes and anion exchange membranes stacked alternately) positioned between two ion solutions having a different concentration performs selective ion permeation due to the difference in concentration, resulting in generation of electric energy. This has been given many attentions recently by virtue of low cost required for generating energy. However, it is merely known that such ion exchange membranes have high output density and thus can be used for a reverse electrodialysis process. There is no specific disclosure about a method for overcoming a trade-off relationship between membrane resistance and ion selectivity through the low bulk resistance of an ion exchange membrane (Patent Documents 2 and 3).

In addition, there is known a method for preparing a sulfonated polyetheretherketone (PEEK) copolymer as an aromatic hydrocarbon-based polymer that can be used as a material for an ion exchange membrane by virtue of high thermal/chemical stability and excellent mechanical properties, and forming the copolymer in the form of an electrospun membrane or flat sheet membrane. However, most of such membranes are applied to a polyelectrolyte membrane for a fuel cell. There is no disclosure about the application of such membranes to salinity difference-based power generation, including a reverse electrodialysis process (Patent Document 4).

Therefore, the present inventors have conducted many studies to extend the application field of an aromatic hydrocarbon-based polymer having high thermal/chemical stability and mechanical properties. As a result, it has been found that when the surface of the ion exchange membrane is coated with a hydrophobic thin film capable of forming a crack-like morphology pattern similar to the pore opening/closing mechanism of a cactus, the crack acts like a nanovalve to delay the desorption of moisture in the membrane during dehumidification and to maintain ion conductivity, and thus controls hydration of the membrane under low-humidifying or non-humidifying environment without morphological deformation of the ion exchange membrane. Therefore, the ion exchange membrane realizes low bulk resistance and significantly improved ion selectivity, and thus can be applied to a reverse electrodialysis process. The present disclosure based on this finding.

REFERENCES

1. Korean Patent Publication No. 10-0727216
2. Korean Patent Publication No. 10-1511990
3. US Patent Application No. US 2013/0288142
4. Korean Patent Publication No. 10-1292214

DISCLOSURE

Technical Problem

A technical problem to be solved by the present disclosure is to provide a self-humidifying membrane for reverse electrodialysis which shows significantly improved ion selectivity while realizing low bulk resistance of an ion exchange membrane, and thus can overcome a trade-off relationship between membrane resistance and ion selectivity, and a method for manufacturing the same.

Technical Solution

In one general aspect, there is provided a self-humidifying membrane for reverse electrodialysis, including: a) an aromatic hydrocarbon-based polymer ion exchange membrane; and b) a hydrophobic thin film-coating layer having a nano-sized crack morphology pattern on the surface of the ion exchange membrane.

The aromatic hydrocarbon-based polymer is selected from the group consisting of a polybenzimidazole-based polymer, polybenzoxazole-based polymer, polyimide-based polymer, polyetherimide-based polymer, polyphenylene sulfide-based polymer, polysulfone-based polymer, polyethersulfone-based polymer, polyetherketone-based polymer, polyetheretherketone-based polymer, polyphenylquinoxaline-based polymer, and a copolymer thereof and a combination thereof.

The aromatic hydrocarbon-based polymer ion exchange membrane includes an aromatic hydrocarbon-based polymer including a first repeating unit represented by the following Chemical Formula 1 and a second repeating unit represented by the following Chemical Formula 2; an aromatic hydrocarbon-based polymer represented by the following Chemical Formula 3, Chemical Formula 4 or Chemical Formula 5.

[Chemical Formula 1]
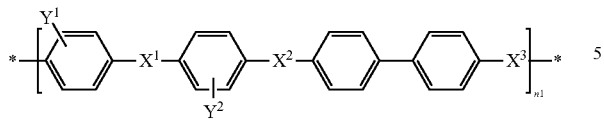
[Chemical Formula 2]
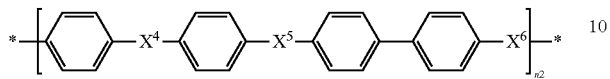
In Chemical Formula 1 and Chemical Formula 2, $X^1$, $X^2$, $X^3$, $X^4$, $X^5$ and $X^6$ are the same or different, and each represents $SO_2$ or O; each of $Y_1$ and $Y_2$ represents $SO_3H$ or $SO_3Na$; n2 is 100−n1; and n1 is an integer of 30−70.
[Chemical Formula 3]
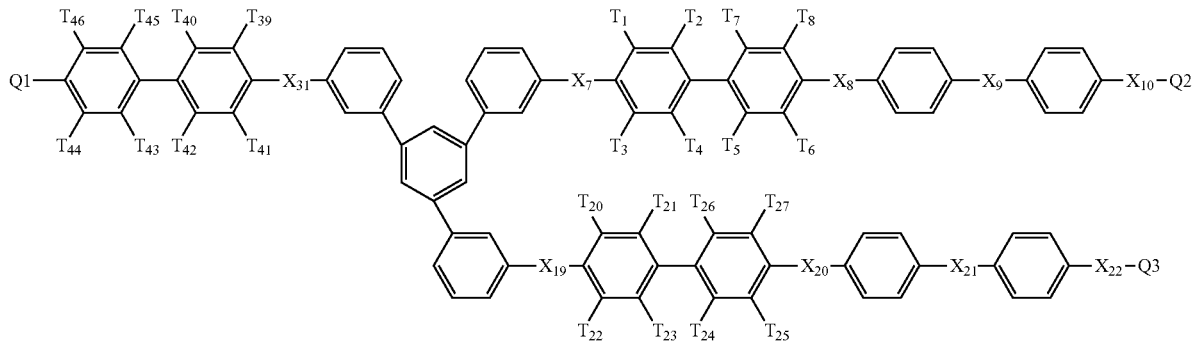
In Chemical Formula 3, Q1 is represented by the following Chemical Formula 3a:
[Chemical Formula 3a]
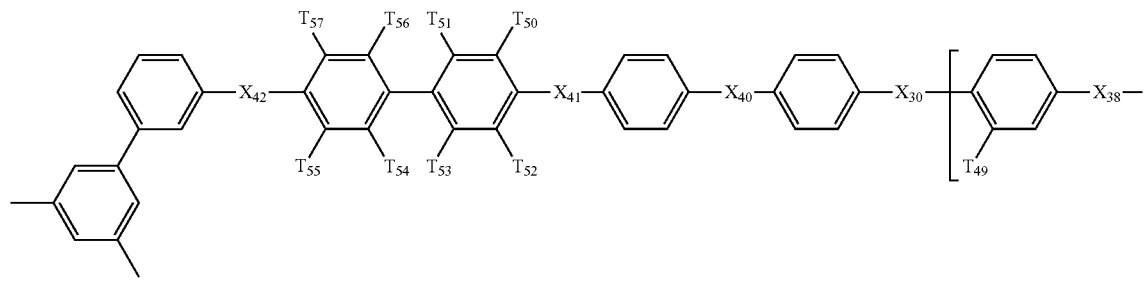
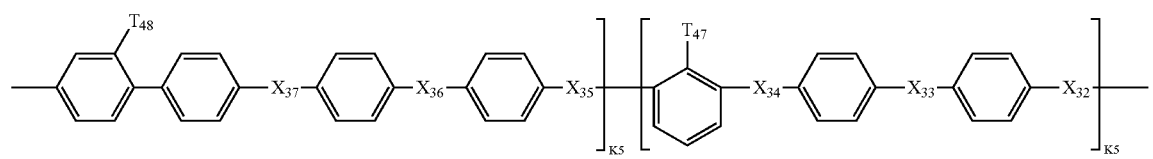

Q2 is represented by the following Chemical Formula 3b:

[Chemical Formula 3b]

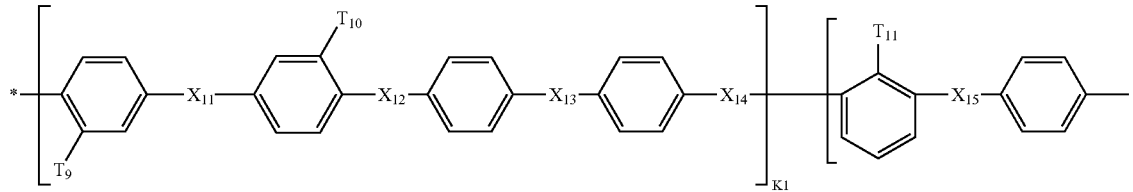

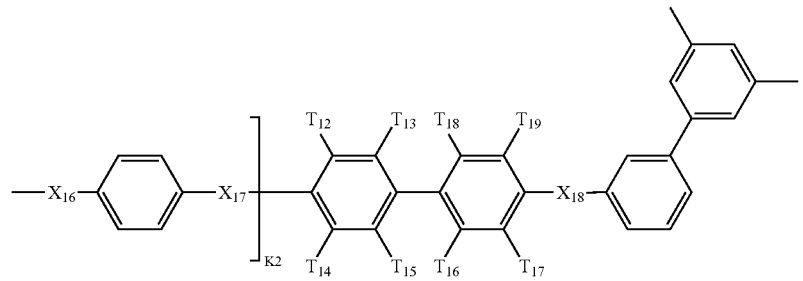

Q3 is represented by the following Chemical Formula 3c:

[Chemical Formula 3c]

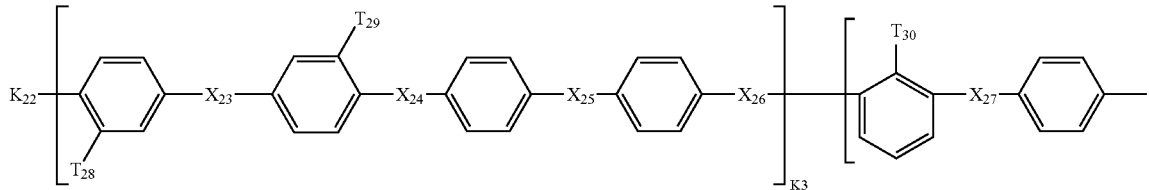

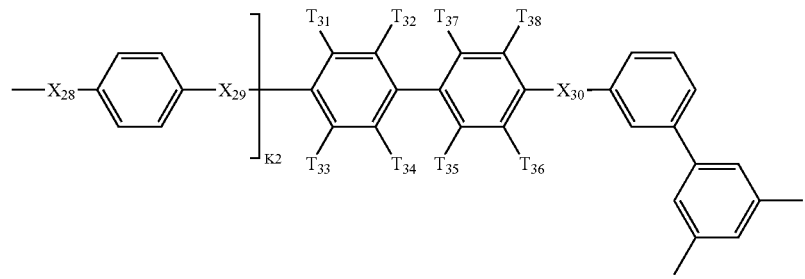

In Chemical formulae 3, 3a, 3b, and 3c, $X_7$, $X_8$, $X_9$, $X_{10}$, $X_{11}$, $X_{12}$, $X_{13}$, $X_{14}$, $X_{15}$, $X_{16}$, $X_{17}$, $X_{18}$, $X_{19}$, $X_{20}$, $X_{21}$, $X_{22}$, $X_{23}$, $X_{24}$, $X_{25}$, $X_{26}$, $X_{27}$, $X_{28}$, $X_{29}$, $X_{30}$, $X_{31}$, $X_{32}$, $X_{33}$, $X_{34}$, $X_{35}$, $X_{36}$, $X_{37}$, $X_{38}$, $X_{39}$, $X_{40}$, $X_{41}$ and $X_{42}$ are the same or different, and each represents sulfide (S), ether (O) or sulfone ($SO_2$); each of $X^{11}$, $X^{23}$ and $X^{38}$ represents sulfone ($SO_2$); $T_1$, $T_2$, $T_3$, $T_4$, $T_5$, $T_6$, $T_7$, $T_8$, $T_9$, $T_{10}$, $T_{11}$, $T_{12}$, $T_{13}$, $T_{14}$, $T_{15}$, $T_{16}$, $T_{17}$, $T_{18}$, $T_{19}$, $T_{20}$, $T_{21}$, $T_{22}$, $T_{23}$, $T_{24}$, $T_{25}$, $T_{26}$, $T_{27}$, $T_{28}$, $T_{29}$, $T_{30}$, $T_{31}$, $T_{32}$, $T_{33}$, $T_{34}$, $T_{35}$, $T_{36}$, $T_{37}$, $T_{38}$, $T_{39}$, $T_{40}$, $T_{41}$, $T_{42}$, $T_{43}$, $T_{44}$, $T_{45}$, $T_{46}$, $T_{47}$, $T_{48}$, $T_{49}$, $T_{50}$, $T_{51}$, $T_{52}$, $T_{53}$, $T_{54}$, $T_{55}$, $T_{56}$ and $T_{57}$ are the same or different, and each represents a fluoro (F), nitrile group (CN) or sulfonade group ($SO_3H$); each of $T_9$, $T_{10}$, $T_{28}$, $T_{29}$, $T_{48}$ and $T_{49}$ represents a sulfonade group ($SO_3H$); each of $T_{11}$, $T_{30}$ and $T_{47}$ represents a nitrile group (CN); k1, k3 and k5 are the same or different (hydrophilic domain), and each represents an integer of 0.4-0.6; k2, k4 and k6 represent 1-k1, 1-k3 and 1-k5 (hydrophobic domain), respectively, are the same or different, and each represents an integer of 0.6-0.4.

[Chemical Formula 4]

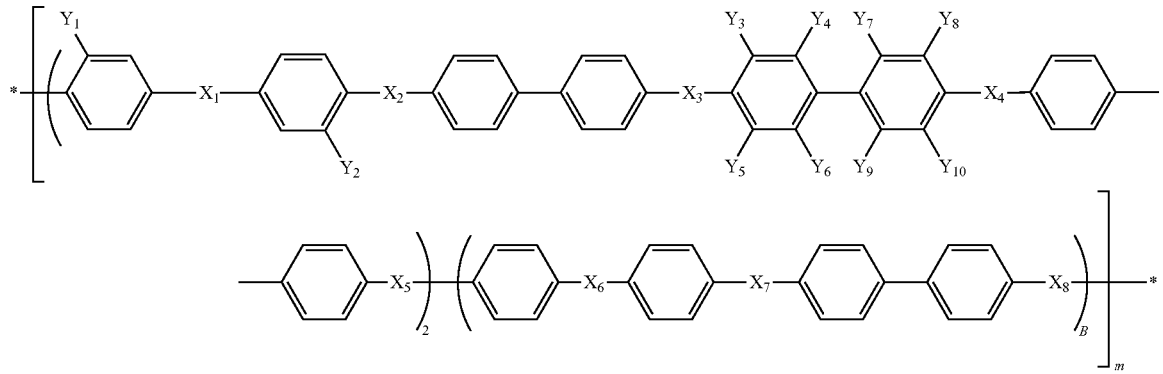

In Chemical Formula 4, $X_1$, $X_2$, $X_3$, $X_4$, $X_5$, $X_6$, $X_7$ and $X_8$ are the same or different, and each represents $SO_2$ or O; each of $Y_1$ and $Y_2$ represents $SO_3H$ or $SO_3Na$; each of $Y_3$, $Y_4$, $Y_5$, $Y_6$, $Y_7$, $Y_8$, $Y_9$ and $Y_{10}$ represents fluoro (F); A represents an integer of 5-30; and B represents an integer of 10-40.

[Chemical Formula 5]

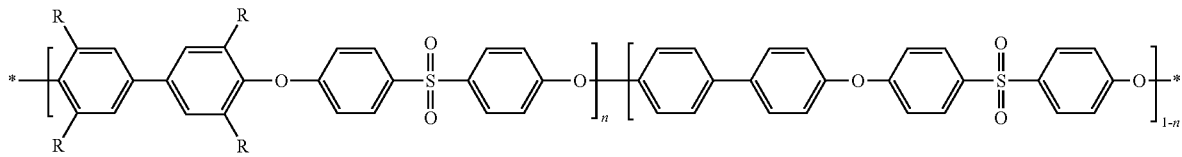

In Chemical Formula 5, R represents $CH_2N(CH_3)_3Cl$; and n represents an integer of 30-70.

The hydrophobic thin film-coating layer includes a hydrophobic functional group which is —$CF_2$—, —$CF_3$ or a combination thereof.

The hydrophobic thin film-coating layer has a thickness of 10-1000 nm.

In another aspect, there is provided a method for manufacturing a self-humidifying membrane for reverse electrodialysis including a step of treating an aromatic hydrocarbon-based polymer ion exchange membrane with atmospheric pressure plasma 3-40 times repeatedly.

The method is characterized by treating the aromatic hydrocarbon-based polymer ion exchange membrane with atmospheric pressure plasma 3-10 times repeatedly.

The step of treating the aromatic hydrocarbon-based polymer with atmospheric pressure plasma is carried out by infusing a first gas selected from argon gas, nitrogen gas, oxygen gas, helium gas and a combination thereof; and a second gas selected from hydrocarbon gas, fluorocarbon gas and a combination thereof.

The hydrocarbon gas is $CH_4$ gas or $C_2H_2$ gas.

The fluorocarbon gas is $C_4F_8$ gas, $CF_4$ gas or a combination thereof.

In still another aspect, there is provided a reverse electrodialysis system including the self-humidifying membrane for reverse electrodialysis.

Advantageous Effects

The self-humidifying membrane including a hydrophobic thin film-coating layer having a nano-sized crack morphology pattern on the surface of an aromatic hydrocarbon-based polymer ion exchange membrane, obtained according to the embodiments of the present disclosure shows significantly improved ion selectivity while realizing low bulk resistance, and thus can overcome a trade-off relationship between membrane resistance and ion selectivity. Therefore, the membrane can be used commercially as an anion and cation exchange membrane for a reverse electrodialysis system.

BEST MODE

Hereinafter, the self-humidifying membrane for reverse electrodialysis according to the present disclosure and a method for manufacturing the same will be described more fully hereinafter with reference to exemplary embodiments and accompanying drawings.

In one aspect, there is provided a self-humidifying membrane for reverse electrodialysis, including: a) an aromatic hydrocarbon-based polymer ion exchange membrane; and b) a hydrophobic thin film-coating layer having a nano-sized crack morphology pattern on the surface of the ion exchange membrane.

Figure 1:
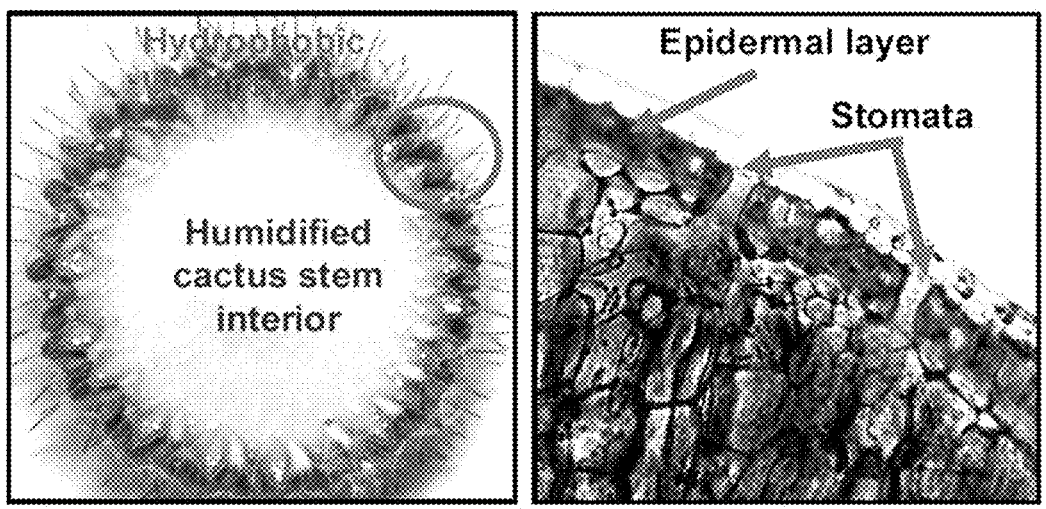
FIG. 1 illustrates the pore opening/closing mechanism of a cactus as a model of the technical gist of the self-humidifying membrane according to the present disclosure.
Figure 1:
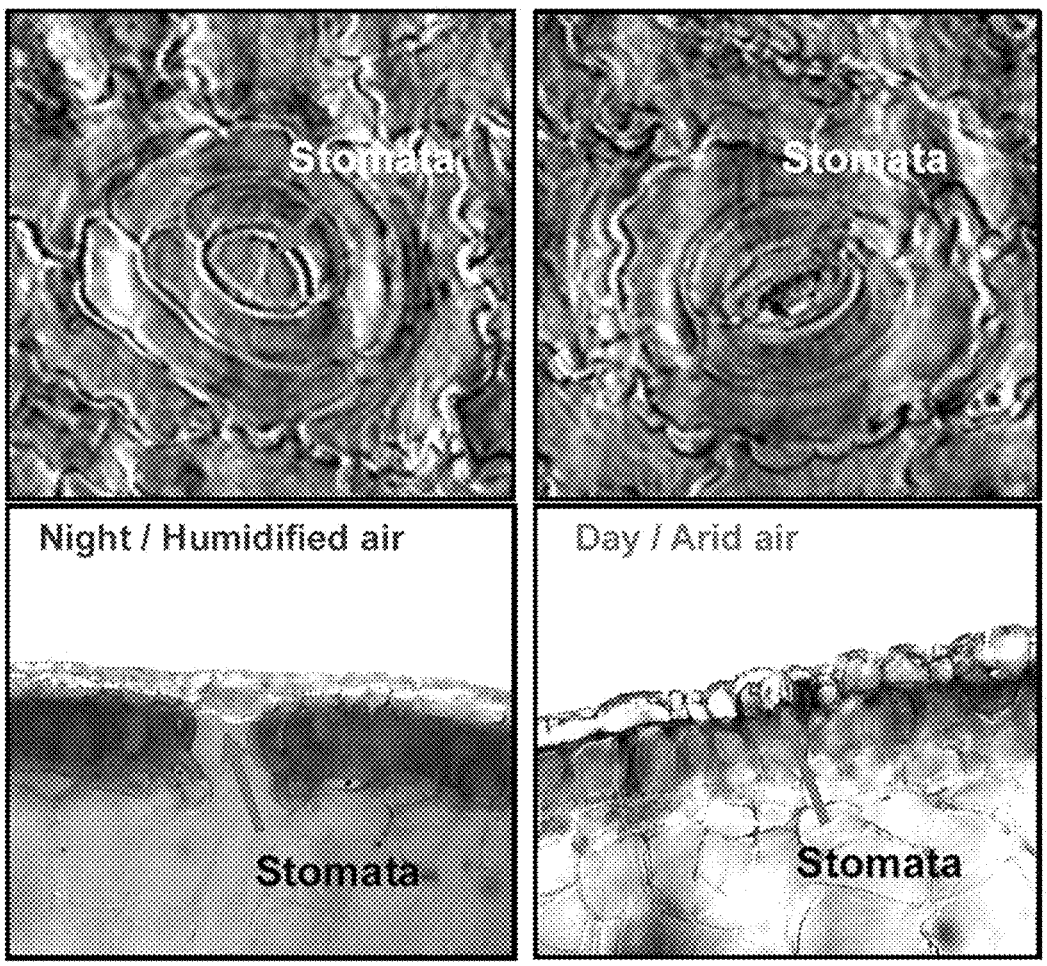

First, FIG. 1 illustrates the pore opening/closing mechanism of a cactus as a model of the technical gist of the self-humidifying membrane according to the present disclosure. As shown in FIG. 1, a cactus retains water by virtue of its unique pore arrangement corresponding to the surrounding environmental condition. To reduce water loss, the pores are open under a low-temperature high-humidity condition, like at night, and the pores are closed during the day largely subjected to under a high-temperature dry condition.

Figure 2:
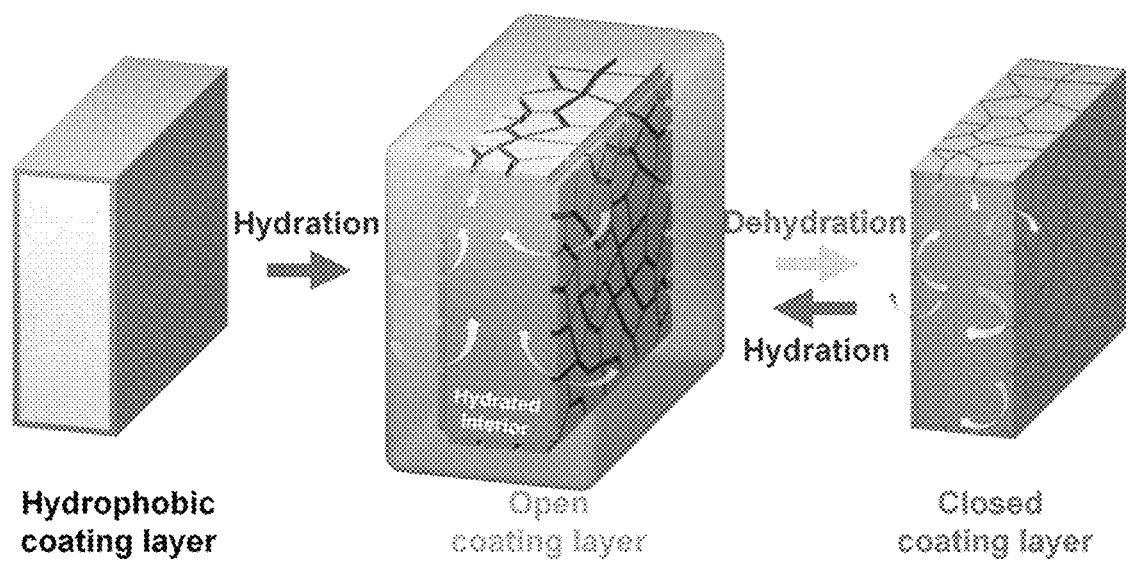
FIG. 2 is a schematic view illustrating a membrane including water-impermeable hydrophobic thin film deposited on the surface thereof so that water exchange may be controlled on the membrane surface.

The present disclosure uses, as its model, the pore opening/closing mechanism of a cactus, and is finished by using the novel concept of controlling the hydration of an ion exchange membrane under low-humidifying or non-humidifying environment while not causing deformation of the morphology of the membrane. As shown in FIG. 2, a water-impermeable hydrophobic thin film is deposited (coated) on the surface of the membrane so that water exchange may be controlled on the membrane surface. It is required for the hydrophobic thin film to solve the contradiction of retaining water in a bulk-state membrane, while not interrupting ions transported through the membrane surface along with water molecules. When water is a transport medium, it is required to give attentions to a significant decrease in ion conductivity in the ion conduction mechanism even in the case of the hydrophobic barrier of a thin film. Therefore, in order to overcome the above-mentioned contradiction, a hydrophobic thin film having nano-sized crack type water channels opened under a humidifying condition is deposed on the surface of the ion exchange membrane.

In other words, when the ion exchange membrane absorbs water and undergoes swelling, the interval between nano-sized cracks is increased depending on the swelling ratio to cause opening of the water channels. In addition, when the hydrated ion exchange membrane is dried, the interval between nano-sized cracks is decreased to cause closing of the water channels and delay of dehydration rate. Thus, water is not completely dried in the ion exchange membrane but is retained therein. Since water is partially retained in the ion exchange membrane as mentioned above, it is possible to carry out ion transport effectively through the ion exchange membrane even under a medium- or low-temperature and low-humidity condition. As a result, the ion exchange membrane may be referred to as a self-humidifying membrane.

According to the present disclosure, an aromatic hydrocarbon-based polymer is used, since it has excellent thermal/chemical stability and mechanical properties and can be used as a material for an ion exchange membrane. The aromatic hydrocarbon-based polymer is selected from the group consisting of a polybenzimidazole-based polymer, polybenzoxazole-based polymer, polyimide-based polymer, polyetherimide-based polymer, polyphenylene sulfide-based polymer, polysulfone-based polymer, polyethersulfone-based polymer, polyetherketone-based polymer, polyetheretherketone-based polymer, polyphenylquinoxaline-based polymer, or a copolymer thereof or a combination thereof. The polymer chain has a cation exchange group or anion exchange group at the side chain thereof.

In addition, the aromatic hydrocarbon-based polymer ion exchange membrane may include an aromatic hydrocarbon-based polymer including a first repeating unit represented by the following Chemical Formula 1 and a second repeating unit represented by the following Chemical Formula 2; an aromatic hydrocarbon-based polymer represented by the following Chemical Formula 3, Chemical Formula 4 or Chemical Formula 5.

[Chemical Formula 1]

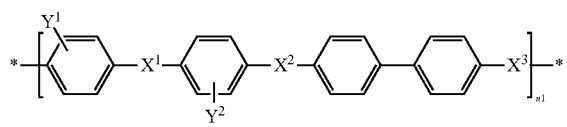

[Chemical Formula 2]

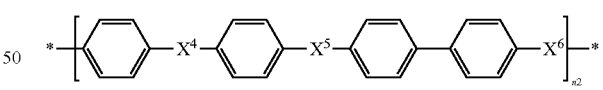

In Chemical Formula 1 and Chemical Formula 2, $X^1$, $X^2$, $X^3$, $X^4$, $X^5$ and $X^6$ are the same or different, and each represents $SO_2$ or O; each of $Y_1$ and $Y_2$ represents $SO_3H$ or $SO_3Na$; n2 is 100–n1; and n1 is an integer of 30-70, preferably an integer of 40-60.

When n1 and n2 are within the above-defined ranges in Chemical Formula 1, the aromatic hydrocarbon-based polymer ion exchange membrane includes sufficient hydrophilic ion channel regions therein to ensure high ion conductivity. Based on this, it is possible to control the surface morphology and hydrophobicity through the hydrophobic thin film coating advantageously.

[Chemical Formula 3]
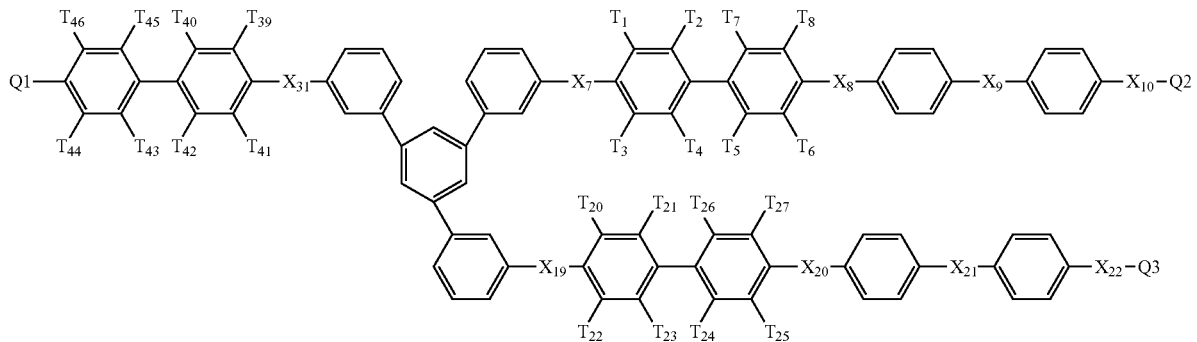
In Chemical Formula 3, Q1 is represented by the following Chemical Formula 3a:
[Chemical Formula 3a]
Q2 is represented by the following Chemical Formula 3b:
[Chemical Formula 3b]

Q3 is represented by the following Chemical Formula 3c:

[Chemical Formula 3c]

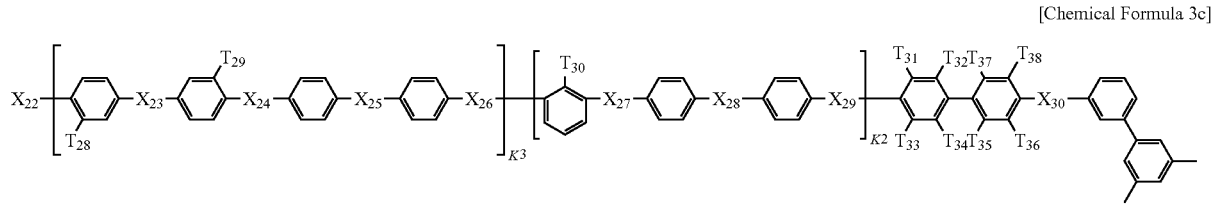

In Chemical formulae 3, 3a, 3b, and 3c, $X_7$, $X_8$, $X_9$, $X_{10}$, $X_{11}$, $X_{12}$, $X_{13}$, $X_{14}$, $X_{15}$, $X_{16}$, $X_{17}$, $X_{18}$, $X_{19}$, $X_{20}$, $X_{21}$, $X_{22}$, $X_{23}$, $X_{24}$, $X_{25}$, $X_{26}$, $X_{27}$, $X_{28}$, $X_{29}$, $X_{30}$, $X_{31}$, $X_{32}$, $X_{33}$, $X_{34}$, $X_{35}$, $X_{36}$, $X_{37}$, $X_{38}$, $X_{39}$, $X_{40}$, $X_{41}$ and $X_{42}$ are the same or different, and each represents sulfide (S), ether (O) or sulfone ($SO_2$); each of $X^{11}$, $X^{23}$ and $X^{38}$ represents sulfone ($SO_2$); $T_1$, $T_2$, $T_3$, $T_4$, $T_5$, $T_6$, $T_7$, $T_8$, $T_9$, $T_{10}$, $T_{11}$, $T_{12}$, $T_{13}$, $T_{14}$, $T_{15}$, $T_{16}$, $T_{17}$, $T_{18}$, $T_{19}$, $T_{20}$, $T_{21}$, $T_{22}$, $T_{23}$, $T_{24}$, $T_{25}$, $T_{26}$, $T_{27}$, $T_{28}$, $T_{29}$, $T_{30}$, $T_{31}$, $T_{32}$, $T_{33}$, $T_{34}$, $T_{35}$, $T_{36}$, $T_{37}$, $T_{38}$, $T_{39}$, $T_{40}$, $T_{41}$, $T_{42}$, $T_{43}$, $T_{44}$, $T_{45}$, $T_{46}$, $T_{47}$, $T_{48}$, $T_{49}$, $T_{50}$, $T_{51}$, $T_{52}$, $T_{53}$, $T_{54}$, $T_{55}$, $T_{56}$ and $T_{57}$ are the same or different, and each represents a fluoro (F), nitrile group (CN) or sulfonade group ($SO_3H$); each of $T_9$, $T_{10}$, $T_{28}$, $T_{29}$, $T_{48}$ and $T_{49}$ represents a sulfonade group ($SO_3H$); each of $T_{11}$, $T_{30}$ and $T_{47}$ represents a nitrile group (CN); k1, k3 and k5 are the same or different (hydrophilic domain), and each represents an integer of 0.4-0.6; k2, k4 and k6 represent 1-k1, 1-k3 and 1-k5 (hydrophobic domain), respectively, are the same or different, and each represents an integer of 0.6-0.4.

[Chemical Formula 4]

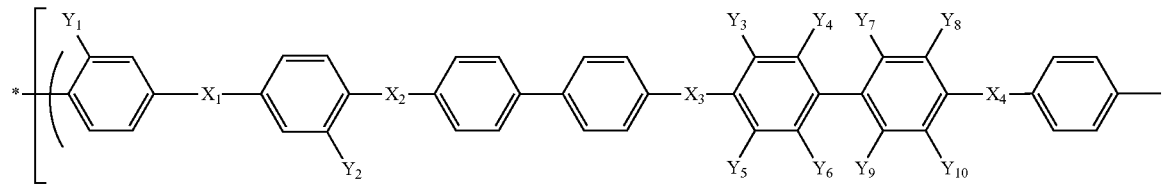

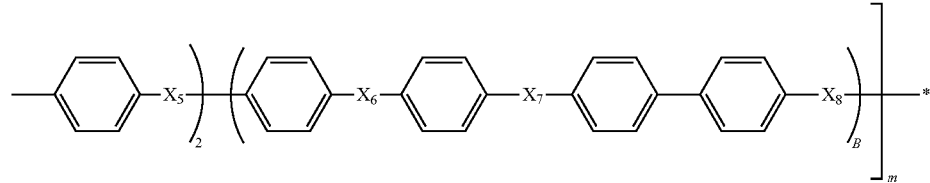

In Chemical Formula 4, $X_1$, $X_2$, $X_3$, $X_4$, $X_5$, $X_6$, $X_7$ and $X_8$ are the same or different, and each represents $SO_2$ or O; each of $Y_1$ and $Y_2$ represents $SO_3H$ or $SO_3Na$; each of $Y_3$, $Y_4$, $Y_5$, $Y_6$, $Y_7$, $Y_8$, $Y_9$ and $Y_{10}$ represents fluoro (F); A represents an integer of 5-30; and B represents an integer of 10-40, which suggests the chain length of the hydrophilic oligomer.

[Chemical Formula 5]

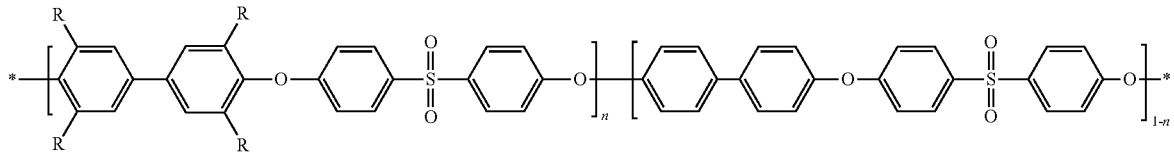

In Chemical Formula 5, R represents $CH_2N(CH_3)_3Cl$; and n represents an integer of 30-70.

The hydrophobic thin film-coating layer may include a hydrophobic functional group which is $—CF_2—$, $—CF_3$ or a combination thereof. The hydrophobic thin film-coating layer has a thickness of 10-1000 nm, preferably 10-50 nm. When the thickness of the hydrophobic thin-film coating layer is not within the range of 10-1000 nm, ion conductivity may be degraded due to the membrane resistance.

In another aspect, there is provided a method for manufacturing a self-humidifying membrane for reverse electrodialysis including a step of treating an aromatic hydrocarbon-based polymer ion exchange membrane with atmospheric pressure plasma 3-40 times repeatedly.

The step of treating with atmospheric pressure plasma is a surface modification method including exposing the surface of the ion exchange membrane to partially ionized gas in a plasma state. Such a method is carried out on a minute surface, and thus is advantageous in that it can perform surface treatment while not damaging the ion exchange membrane itself and not causing any significant change in internal physical properties, and it produces a small amount of contaminants.

Herein, the step of treating the aromatic hydrocarbon-based polymer with atmospheric pressure plasma is carried out by infusing a first gas selected from argon gas, nitrogen gas, oxygen gas, helium gas and a combination thereof; and a second gas selected from hydrocarbon gas, fluorocarbon gas and a combination thereof. The hydrocarbon gas may be $CH_4$ gas or $C_2H_2$ gas, and the fluorocarbon gas may be $C_4F_8$ gas, $CF_4$ gas or a combination thereof.

When the atmospheric pressure plasma-treating step is repeated less than 3 times, the hydrophobic coating layer cannot be deposited sufficiently, and thus the coating layer cannot be formed completely. When the atmospheric pressure plasma-treating step is repeated more than 40 times, plasma polymerization is activated excessively to form a coating layer with an excessively large thickness, resulting in degradation of ion conductivity.

Further, when the atmospheric pressure plasma-treating step is repeated 3-10 times, it is possible to provide significantly high permeation selectivity while realizing low resistance of the plasma-treated membrane. Thus, the membrane is preferred as a membrane for use in reverse electrodialysis.

Figure 3:
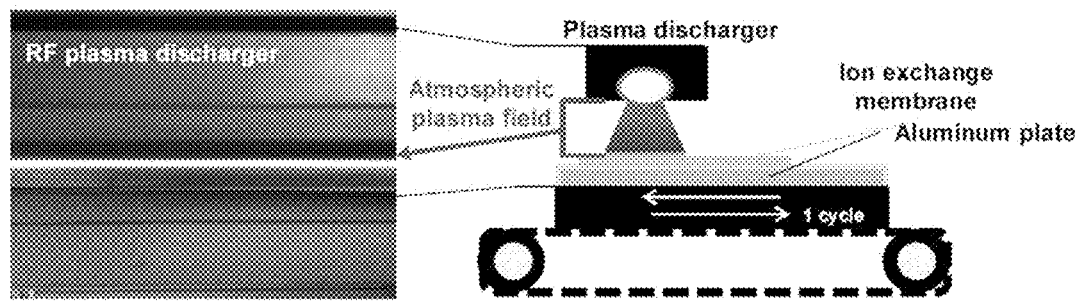
FIG. 3 illustrates (a) a plasma treatment system according to the present disclosure, and (b) a system for forming a fluorocarbon polymer thin film layer.
Figure 3:
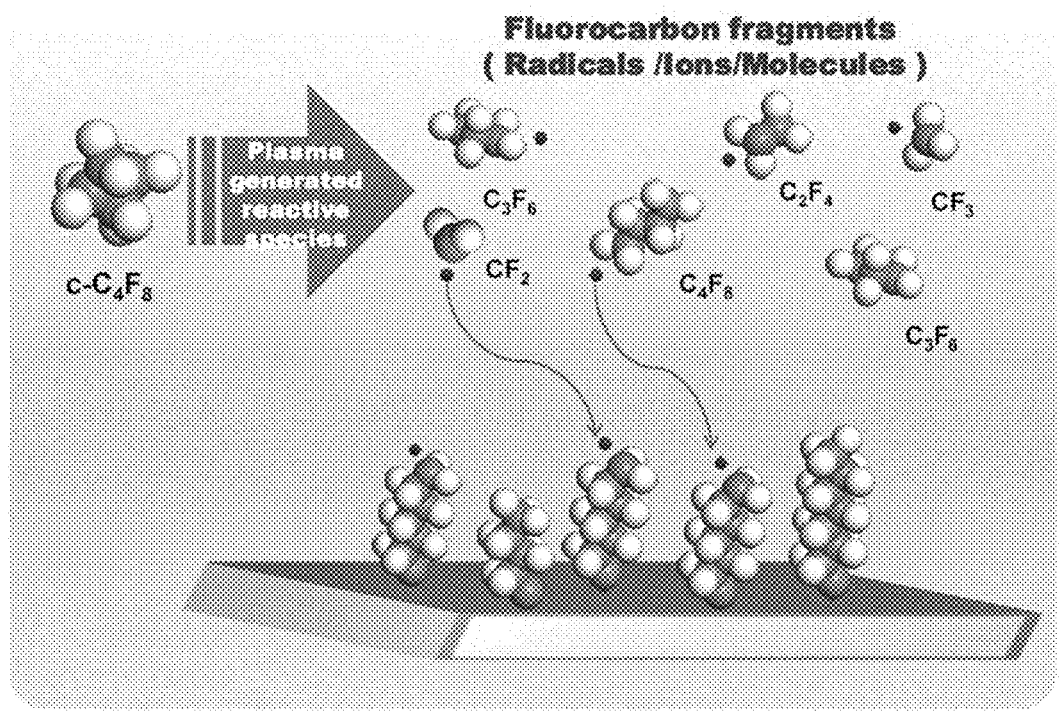

According to an embodiment of the atmospheric pressure plasma-treating step, helium gas is used as the first gas which is a carrier gas and octafluorocyclobutane ($C_4F_8$) is used as the second gas which is a reactant gas, and radio-frequency (RF) electric power is supplied thereto to generate radicals, such as $—CF_2$ and $—CF_3$, ions and plasma under atmospheric pressure and treatment is repeated (3-40 times). In this manner, a fluorocarbon polymer thin film layer is deposited (coated) effectively on the surface of the aromatic hydrocarbon-based polymer ion exchange membrane to a thickness of 10-1000 nm, thereby increasing the hydrophobicity of the aromatic hydrocarbon-based polymer ion exchange membrane. According to the related art, hydrophobic treatment has been carried out by adding hydrophobic organic/inorganic particles and materials, and thus the overall physical properties and structure of the ion exchange membrane have been changed. However, in the case of the atmospheric pressure plasma treatment according to the present disclosure, it is possible to change only the hydrophilicity/hydrophobicity and surface morphology of the ion exchange membrane without any change of the physical properties and physicochemical structure of the existing ion exchange membrane. In addition, unlike the atmospheric pressure plasma treatment based on dielectric barrier discharge (DBD), it is possible to carry out large-scale continuous plasma treatment in a conveyor belt mode and to control the plasma polymerization suitable for hydrophobic surface treatment of the ion exchange membrane. FIG. 3 illustrates (a) a plasma treatment system according to the present disclosure, and (b) a system for forming a fluorocarbon polymer thin film layer.

According to the atmospheric pressure plasma treatment disclosed herein, the hydrophobic plasma coating layer is formed differently depending on the ratio of the nano-sized hydrophilic domain and hydrophobic domain of the aromatic hydrocarbon-based polymer ion exchange membrane. During hydration, nano-cracks are formed with a width of 10 nm-500 nm on the surface of the hydrophobic plasma coating layer, depending on the hydration swelling ratio of the hydrophobic plasma coating layer, and then the nano-cracks are downsized to 5 nm-100 nm depending on a drying process, water content and swelling ratio. Then, the distribution of nano-cracks is controlled to delay water emission from the ion exchange membrane so that the ion exchange membrane may ensure excellent hydration retention capability at a medium or high temperature (30-120° C.) under a low-humidifying condition (relative humidity 30-100%). The hydrophobic plasma coating layer controlling mechanism may be controlled reversibly depending on a hydration condition to improve the durability of the ion exchange membrane. This is a self-regulating surface control system which cannot be seen from the hydrophobic plasma coating layer formed to a thickness larger than 1 μm on the surface of a polymer film and inorganic material according to the related art, and allows control of surface morphology depending on wetting and swelling beyond the range of simple hydrophobic treatment.

Particularly, in the case of a polyarylene ether sulfone-based ion exchange membrane having a sulfonate group ($SO_3H$ or $SO_3Na$), it is possible to delay water diffusion from the inside of the ion exchange membrane effectively, and thus to improve ion conductivity even under a low-humidifying condition, while forming a unique hydrophilic nano-sized crack surface morphology depending on the sulfonation degree (40-60), without any degradation of ion conductivity and ion exchange capacity.

MODES FOR INVENTION

Exemplary embodiments now will be described more fully hereinafter with reference to the accompanying drawings.

Example 1

Sulfonated polyarylene ether sulfone having the first repeating unit represented by the following [Chemical Formula 1a] and the second repeating unit represented by the following [Chemical Formula 2a] was prepared according to the known method. Next, it was dissolved into N-methyl pyrrolidone (NMP) as a solvent to 15 wt % and formed into a film by a casting process to obtain a cation exchange membrane (BPSNa type, CBPS) having a thickness of 50 μm (BPSH was also obtained by treating BPSNA with sulfuric acid to convert Na into H). The resultant cation exchange membrane was positioned on the sample holder in a plasma chamber and the surface facing the top is allowed to face the plasma generation system and the opposite surface is allowed to face the bottom of the sample holder. Then, plasma treatment was carried out under the conditions of 13.56 mHz RF and 150 W output, while helium gas was infused at a rate of 20 L/min and $C_4F_8$ was also infused at a rate of 10 mL/min, thereby providing a cation exchange membrane one surface of which was hydrophobically surface treated. After that, the non-treated surface (the surface opposite to the hydrophobically treated surface) of the cation exchange membrane one surface of which was hydrophobically surface treated was further subjected to plasma treatment under the same condition as mentioned above to obtain a cation exchange membrane both surfaces of which were hydrophobically treated. The hydrophobic treatment was repeated 30 times to obtain a self-humidifying cation exchange membrane (P-BPSH60) having a thin-film thickness of 50 nm as a target product.

[Chemical Formula 1a]

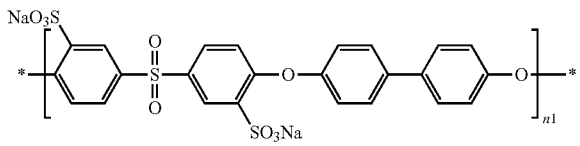

[Chemical Formula 2a]

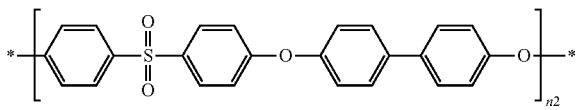

In Chemical Formula 1a and Chemical Formula 2a, n1 is 60 and n2 is 40.

Example 2

A self-humidifying cation exchange membrane (P-BPSH40) having a thin-film thickness of 10 nm was obtained as a target product in the same manner as described in Example 1, except that n1 is 40 and n2 is 60 in Chemical Formula 1a and Chemical Formula 2a of Example 1 and the hydrophobic treatment was repeated 20 times.

Example 3

Aminated polyarylene ether sulfone having a repeating unit represented by the following [Chemical Formula 5a] was prepared and formed into a film by a casting process according to the known method to obtain an anion exchange membrane having a thickness of 50 µm. The resultant anion exchange membrane was treated with plasma in the same manner as described in Example 1 to obtain a self-humidifying anion exchange membrane (P-ABPS60) having a thin-film thickness of 50 nm as a target product.

In Chemical Formula 5a, R represents $CH_2N(CH_3)_3Cl$, and n is 60.

Example 4

A self-humidifying anion exchange membrane (P-ABPS40) having a thin-film thickness of 10 nm was obtained as a target product in the same manner as described in Example 3, except that n is 40 in Chemical Formula 5a of Example 3 and the hydrophobic treatment was repeated 20 times.

Example 5

Self-humidifying cation exchange membranes were obtained in the same manner as described in Example 1, except that the hydrophobic treatment with plasma was repeated 3 times (PC60R3), 5 times (PC60R5), 7 times (PC60R7) and 10 times (PC60R10).

Example 6

Self-humidifying cation exchange membranes were obtained in the same manner as described in Example 2, except that the hydrophobic treatment with plasma was repeated 3 times (PC40R3), 5 times (PC40R5), 7 times (PC40R7) and 10 times (PC40R10).

Example 7

Self-humidifying anion exchange membranes were obtained in the same manner as described in Example 3, except that the hydrophobic treatment with plasma was repeated 3 times (PA60R3), 5 times (PA60R5), 7 times (PA60R7) and 10 times (PA60R10).

Example 8

Self-humidifying anion exchange membranes were obtained in the same manner as described in Example 4, except that the hydrophobic treatment with plasma was repeated 3 times (PA40R3), 5 times (PA40R5), 7 times (PA40R7) and 10 times (PA40R10).

Comparative Examples 1-4

Comparative Example 1 was carried out in the same manner as Example 1 to obtain a cation exchange membrane (C60), except that plasma treatment was not carried out. Comparative Example 2 was carried out in the same manner as Example 2 to obtain a cation exchange membrane (C40), except that plasma treatment was not carried out. Comparative Example 3 was carried out in the same manner as Example 3 to obtain a cation exchange membrane (A60), except that plasma treatment was not carried out. Comparative Example 4 was carried out in the same manner as

[Chemical Formula 5a]

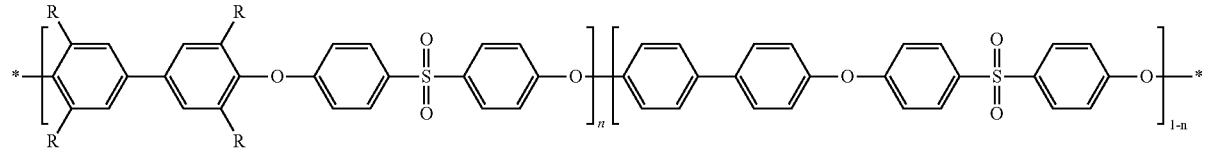

Example 4 to obtain a cation exchange membrane (A40), except that plasma treatment was not carried out.

Figure 4:
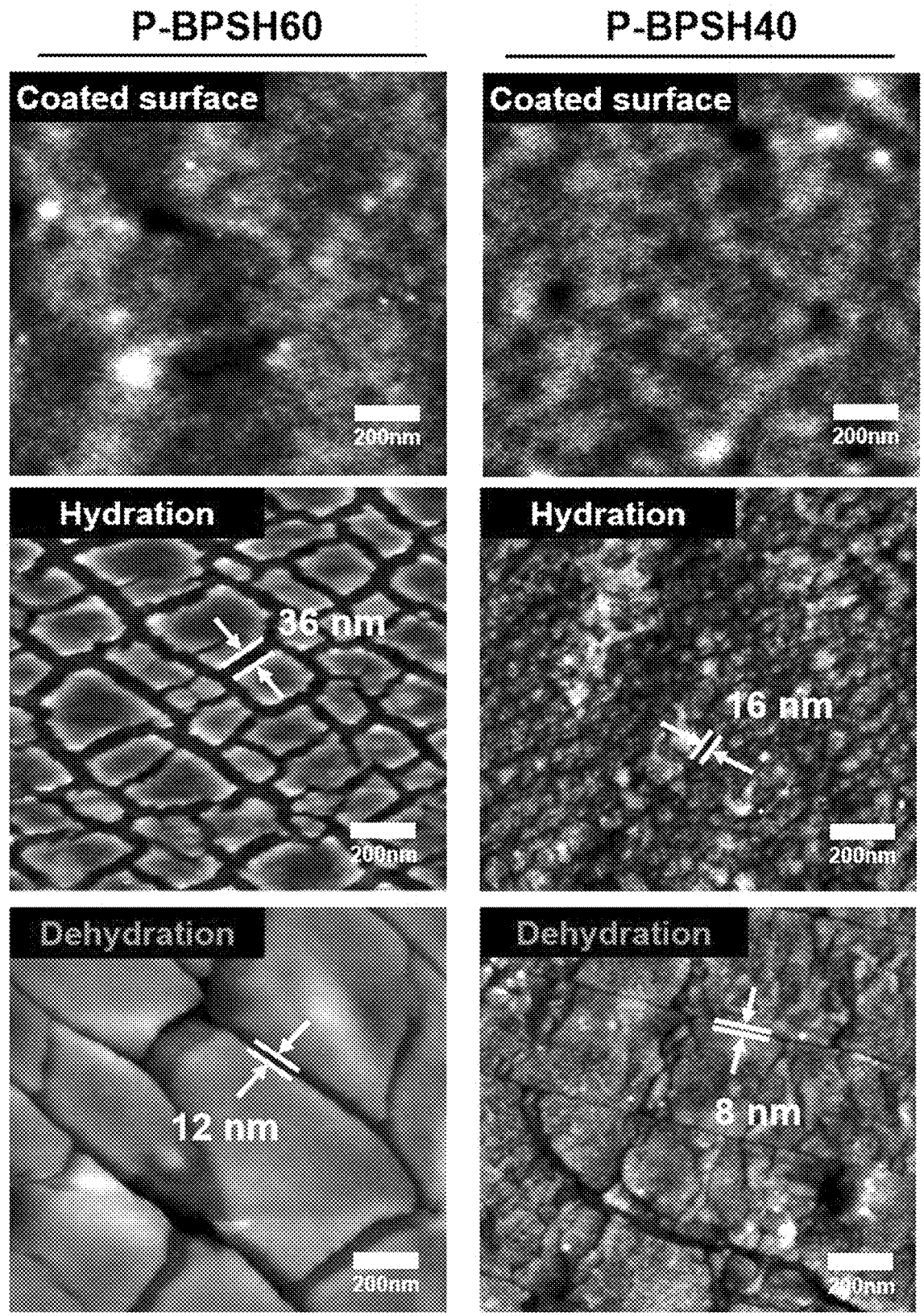
FIG. 4 is an atomic force microscopic (AFM) image illustrating a change in surface morphology of the self-humidifying cation exchange membranes according to Examples 1 and 2.

FIG. 4 is an atomic force microscopic (AFM) image illustrating a change in surface morphology of the self-humidifying cation exchange membranes according to Examples 1 and 2. As can be seen from FIG. 4, the plasma-treated cation exchange membranes have a self-controlling mechanism depending on the hydration degree. In other words, no nano-cracks can be seen from the surface coated through plasma treatment. However, as hydration proceeds, the membrane undergoes swelling to induce opening of nano-cracks so that it may be in a state capable of absorbing water. Meanwhile, while the plasma-treatment membrane is dehydrated, nano-cracks are closed to reduce water loss.

Figure 5:
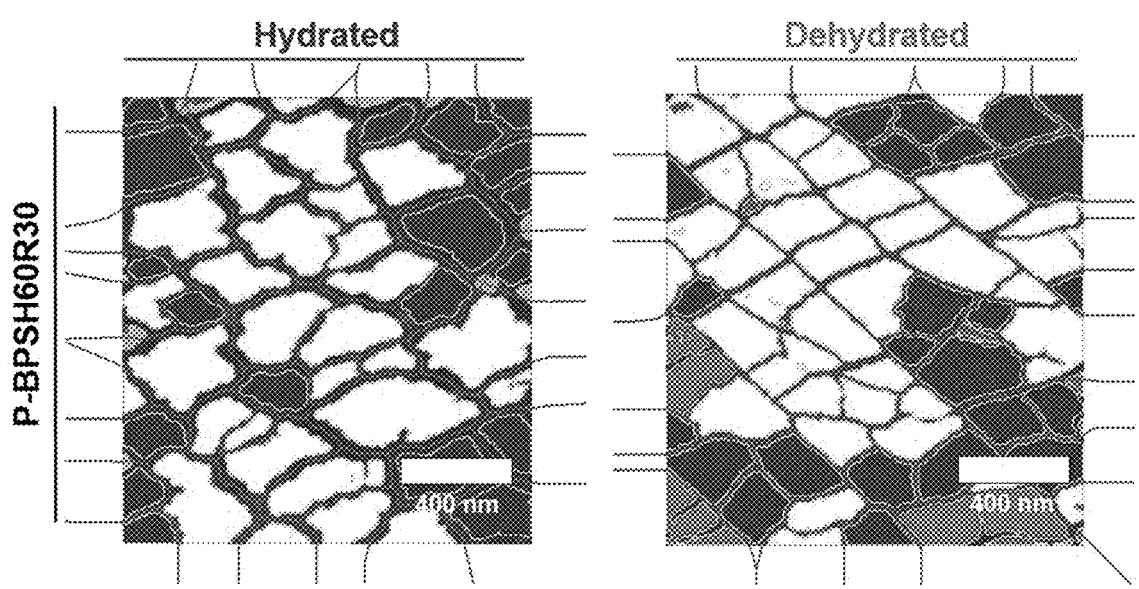
FIG. 5 illustrates the Voronoi diagram of the self-humidifying cation exchange membrane (P-BPSH60) according to Example 1, in its hydrated state and dehydrated state, respectively.

In addition, the Voronoi diagram analysis and tessellation entropy as shown in FIG. 5 demonstrates the controllable surface pattern of nano-cracks of the self-humidifying cation exchange membrane (P-BPSH60) according to Example 1.

Figure 6:
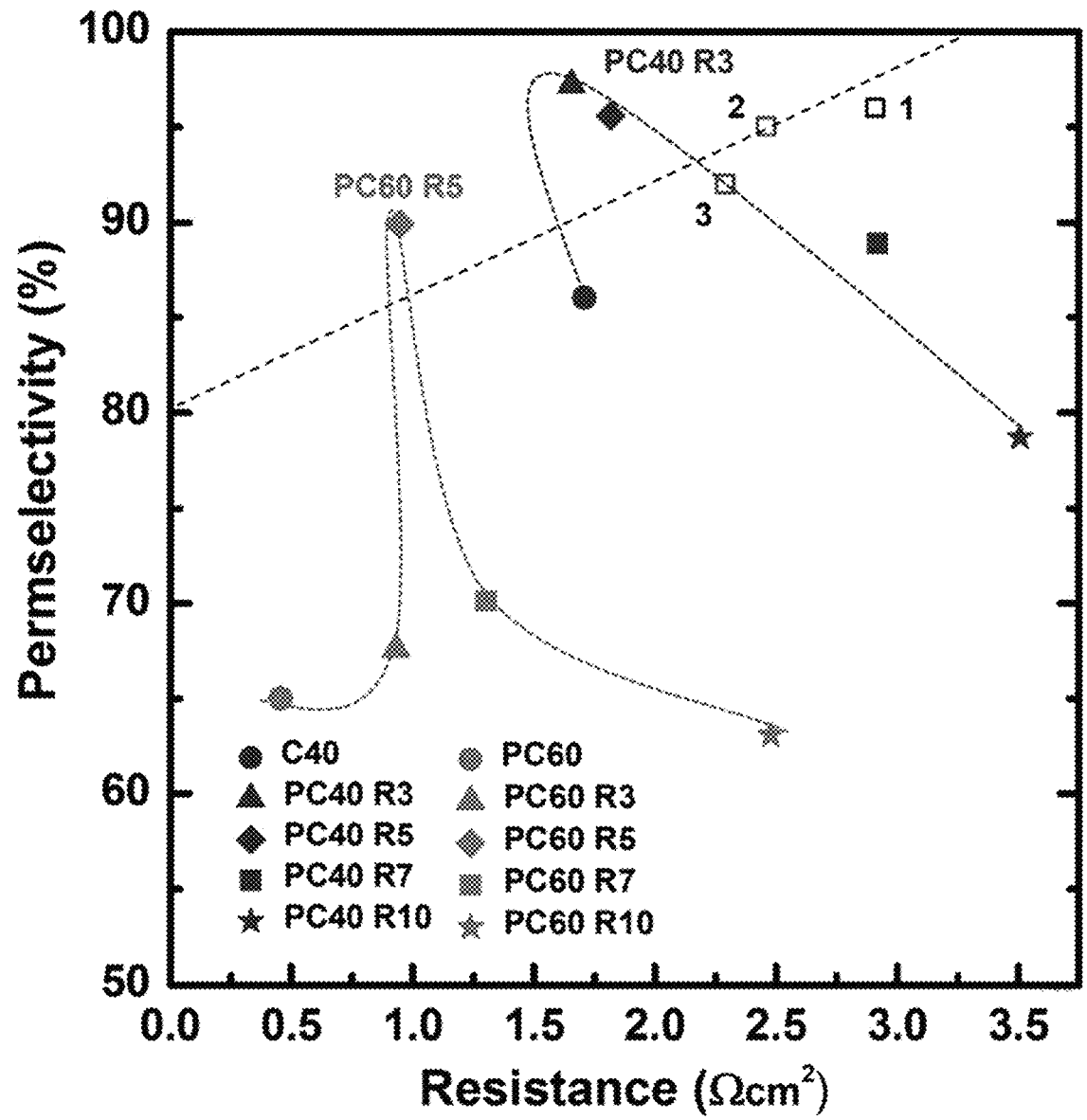
FIG. 6 is a graph illustrating the permeation selectivity of each of the self-humidifying cation exchange membranes according to Examples 5 and 6 as a function of resistance.
Figure 7:
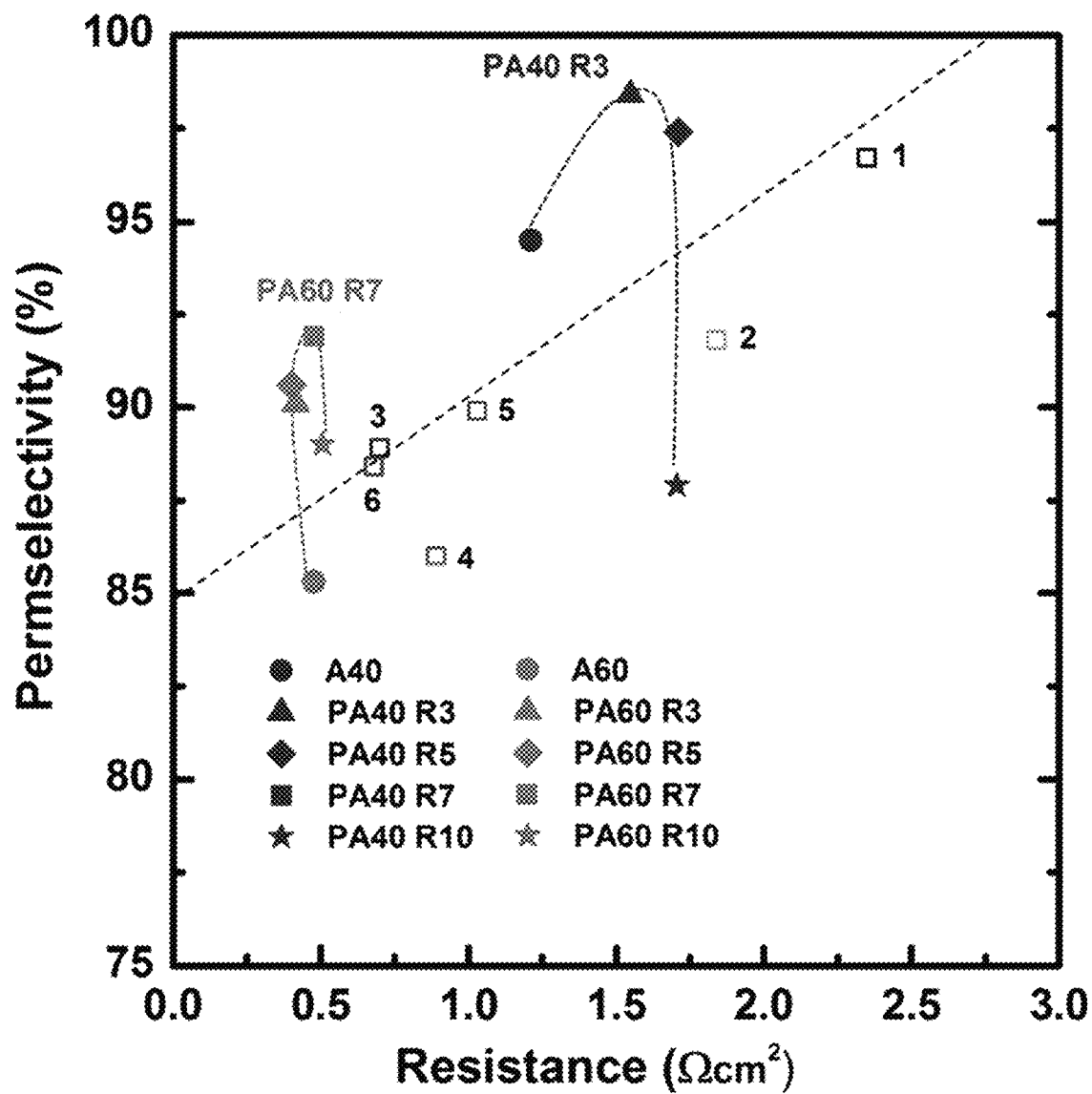
FIG. 7 is a graph illustrating the permeation selectivity of each of the self-humidifying anion exchange membranes according to Examples 7 and 8 as a function of the resistance.

Further, FIG. 6 is a graph illustrating the permeation selectivity of each of the self-humidifying cation exchange membranes according to Examples 5 and 6 as a function of resistance, and FIG. 7 is a graph illustrating the permeation selectivity of each of the self-humidifying anion exchange membranes according to Examples 7 and 8 as a function of the resistance, in comparison with the ion exchange membranes (Comparative Examples 1-4) not subjected to plasma treatment and commercially available ion exchange membranes (in FIG. 6, □1: CMX, □2: FKD, □3: CMV; in FIG. 7, □1: AMX, □2: AM-1, □3: AFN, □4: FAD, □5: DSV, □6: APS).

As shown in FIG. 6 and FIG. 7, it can be seen that the self-humidifying cation exchange membranes and anion exchange membranes according to Examples 5-8 show better performance as compared to the commercially available cation exchange membranes and anion exchange membranes. Particularly, as shown in FIG. 6, in the case of the cation exchange membrane treated with plasma 3 times or 5 times, it provides a significantly high permeation selectivity exceeding 95%, while showing a low membrane resistance value less than 1.75 Ω·cm². In addition, the ion selective coating film significantly increases the permeation selectivity of the membrane having a high ratio of ionic functional groups (CBPS60, ABPS60) to 65%-89% or 92%.

In other words, the improved ion transportability of the self-humidifying cation exchange membranes and anion exchange membranes according to Examples 5-8 depends on the hydrophobic membrane surface having an optimized thickness and morphology of nano-cracks. This not only affects the ion concentration polarization in an electric dual layer but also limits transport of counter ions. Particularly, the ion selective coating film maintains low membrane resistance, while it increases the permeation selectivity of the ion exchange membrane (PC60 or PA60) significantly. As a result, it is possible to overcome a trade-off relationship between membrane resistance and ion selectivity.

INDUSTRIAL APPLICABILITY

As can be seen from the foregoing, the self-humidifying ion exchange membrane according to the atmospheric pressure plasma treatment disclosed herein has a low membrane resistance value less than 1.0 Ω·cm², while showing significantly high ion selectivity. Thus, it is expected that the self-humidifying ion exchange membrane according to the present disclosure is applied to and commercialized as a reverse electrodialysis system for high electric power generation.

The invention claimed is:

1. A humidifying membrane for reverse electrodialysis, comprising:

a) an aromatic hydrocarbon-based polymer ion exchange membrane of the following Chemical Formula 5:

[Chemical Formula 5]

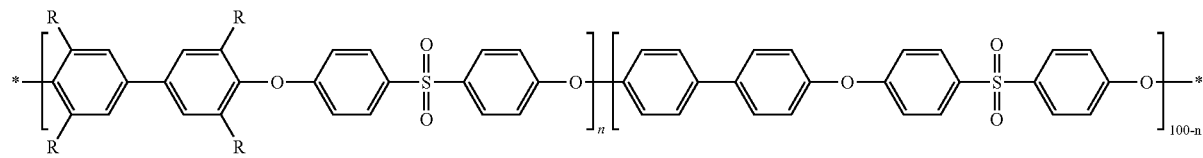

wherein, R represents $CH_2N(CH_3)_3Cl$; and n represents an integer of 30-70; and b) a hydrophobic thin film-coating layer having a nano-sized crack morphology pattern on the surface of the ion exchange membrane.

2. The humidifying membrane for reverse electrodialysis according to claim 1, wherein the hydrophobic thin film-coating layer comprises a hydrophobic functional group which is —$CF_2$—, —$CF_3$ or a combination thereof.

3. The humidifying membrane for reverse electrodialysis according to claim 1, wherein the hydrophobic thin film-coating layer has a thickness of 10-1000 nm.

4. A method for manufacturing the humidifying membrane for reverse electrodialysis according to claim 1 comprising a step of treating an aromatic hydrocarbon-based polymer ion exchange membrane of the following Chemical Formula 5:

[Chemical Formula 5]

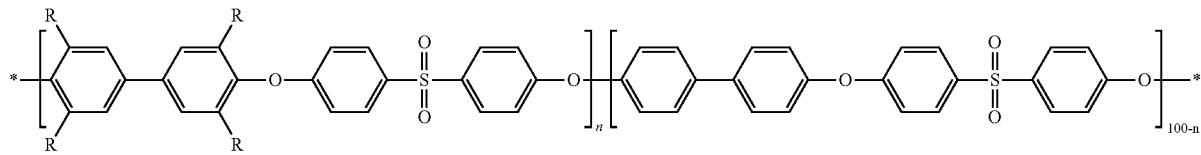

wherein, R represents $CH_2N(CH_3)_3Cl$, and n represents an integer of 30-70, with atmospheric pressure plasma 3-40 times repeatedly.

5. The method for manufacturing a humidifying membrane for reverse electrodialysis according to claim 4, wherein the aromatic hydrocarbon-based polymer ion exchange membrane is treated with atmospheric pressure plasma 3-10 times repeatedly.

6. The method for manufacturing a humidifying membrane for reverse electrodialysis according to claim 4, wherein the step of treating the aromatic hydrocarbon-based polymer with atmospheric pressure plasma is carried out by infusing a first gas selected from argon gas, nitrogen gas, oxygen gas, helium gas and a combination thereof; and a second gas selected from hydrocarbon gas, fluorocarbon gas and a combination thereof.

7. The method for manufacturing a humidifying membrane for reverse electrodialysis according to claim 6, wherein the hydrocarbon gas is $CH_4$ gas or $C_2H_2$ gas.

8. The method for manufacturing a humidifying membrane for reverse electrodialysis according to claim 6, wherein the fluorocarbon gas is $C_4F_8$ gas, $CF_4$ gas or a combination thereof.

9. A reverse electrodialysis system comprising the humidifying membrane for reverse electrodialysis as defined in claim 1.

* * * * *